(12) United States Patent
Enjoji et al.

(10) Patent No.: US 7,201,981 B2
(45) Date of Patent: Apr. 10, 2007

(54) FUEL CELL STACK AND METHOD OF WARMING UP THE SAME

(75) Inventors: Naoyuki Enjoji, Utsunomiya (JP); Toshiaki Ariyoshi, Utsunomiya (JP); Yuichiro Kosaka, Utsunomiya (JP); Kazuya Sasamoto, Haga-gun (JP); Yoshinori Wariishi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 497 days.

(21) Appl. No.: 10/717,330

(22) Filed: Nov. 18, 2003

(65) Prior Publication Data
US 2004/0101728 A1    May 27, 2004

(30) Foreign Application Priority Data
Nov. 18, 2002  (JP)  ............................. 2002-333735

(51) Int. Cl.
*H01M 8/04* (2006.01)
*H01M 8/24* (2006.01)
(52) U.S. Cl. ......................................... 429/13; 429/26
(58) Field of Classification Search ................. 429/13, 429/22, 24, 26
See application file for complete search history.

(56) References Cited

U.S. PATENT DOCUMENTS 5,798,186 A    8/1998  Fletcher et al.
6,186,254 B1 *  2/2001  Mufford et al. ........... 429/26 X
6,383,670 B1 *  5/2002  Edlund et al. ............ 429/22 X
6,489,048 B1 * 12/2002  Ernst et al. .................... 429/13
6,686,080 B2 *  2/2004  Farkash et al. ............... 429/26
6,727,013 B2 *  4/2004  Wheat et al. .................. 429/24

FOREIGN PATENT DOCUMENTS

| JP | 60-138855   | 7/1985  |
|----|-------------|---------|
| JP | 04-306570   | 10/1992 |
| JP | 05-047397   | 2/1993  |
| JP | 08-022834   | 1/1996  |
| JP | 2000-277136 | 6/2000  |
| JP | 2001-236978 | 8/2001  |
| JP | 2002-208429 | 7/2002  |
| JP | 2003-109636 | 4/2003  |

* cited by examiner

*Primary Examiner*—Stephen J. Kalafut
(74) *Attorney, Agent, or Firm*—Lahive & Cockfield, LLP; Anthony A. Laurentano, Esq.

(57) ABSTRACT

A fuel cell stack is formed by stacking a plurality of fuel cells. A heating mechanism is provided for heating an outermost fuel cell by external electrical energy. A power generation circuit including electric heaters corresponding to the fuel cells is provided. Further, a switching mechanism including switches for selectively connecting the fuel cells to the power generation circuit or selectively disconnecting the fuel cells from the power generation circuit is provided.

11 Claims, 13 Drawing Sheets

FUEL CELL STACK AND METHOD OF WARMING UP THE SAME

BACKGROUND OF THE INVENTION

1. Field of the Invention

The present invention relates to a fuel cell stack formed by stacking a plurality of fuel cells. Each of the fuel cells includes an electrolyte electrode assembly and a pair of separators for sandwiching the electrolyte electrode assembly. Further, the present invention relates to a method of warming up the fuel cell stack.

2. Description of the Related Art

Generally, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

If the fuel cell has a low temperature at the time of starting operation, power generation can not be performed efficiently. It takes considerable time to raise the temperature of the fuel cell to the desired temperature for power generation. In particular, if operation of the fuel cell is started at a temperature below zero (freezing temperature), water condensation is likely to occur due to the heat radiated outwardly from the fuel cell, and the water produced in the reaction of the fuel cell is not smoothly discharged from the fuel cell. Thus, the desired power generation performance of the fuel cell may not be achieved.

In an attempt to address the problem, the U.S. Pat. No. 5,798,186 discloses a fuel cell system in which a fuel cell stack is connected to an external electrical circuit. Electric current from the fuel cell stack is supplied to the external electrical circuit such that temperature of the membrane electrode assembly exceeds the freezing temperature of water.

FIG. 13 shows the fuel cell stack 1 disclosed in the U.S. Pat. No. 5,798,186. The fuel cell stack 1 includes negative and positive bus plates 2, 3. An external circuit 5 comprising a variable load 4 is electrically connectable to the bus plates 2, 3 by a switch 6.

In the fuel cell system of the U.S. Pat. No. 5,798,186, the temperature of the entire fuel cell stack 1 is raised by self-heating (the exothermic reaction of hydrogen and oxygen within the fuel cell stack 1 and the resistive heating due to internal ohmic losses). If operation of the fuel cell stack 1 is started at a low temperature, a large amount of heat energy is needed for warming up the entire fuel cell stack. It takes a considerably long time for warming up the fuel cell stack 1, and a considerably large electrical energy is required. In particular, if operation of the fuel cell stack is started at a temperature below the freezing temperature, the water produced in the fuel cell stack may freeze undesirably, and power generation can not be performed.

SUMMARY OF THE INVENTION

A general object of the present invention is to provide a fuel cell stack having a simple structure and a method of warming up the fuel cell stack in which the fuel cell stack can be warmed up reliably in a short period of time with a simple process, and operation of the fuel cell stack can be started rapidly.

According to the fuel cell stack of the present invention, a heating mechanism is provided for heating at least one of fuel cells by external electrical energy. A power generation circuit for causing the fuel cell the to generate electrical energy is provided. Further, a switching mechanism for selectively connecting the fuel cells to the power generation circuit and selectively disconnecting the fuel cells from the power generation circuit is provided.

At least one fuel cell is warmed up by external electrical energy until temperature of the at least one fuel cell reaches a power generation temperature. The at least one fuel cell generates electrical energy for warming up another fuel cell adjacent to the at least one fuel cell. The at least one fuel cell and the other fuel cell generate electrical energy for warming up still another fuel cell. The above steps are repeated in all of the fuel cells for warming up all of the fuel cells.

As described above, at least one of the fuel cells is heated by external electrical energy, and warmed up until temperature of the fuel cell reaches the power generation temperature. Then, the fuel cell starts power generation to warm up the adjacent fuel cell. Since it is not necessary to warm up the entire fuel cell stack externally, the external thermal energy needed for warming up the fuel cell is considerably reduced. The heating mechanism can warm up the fuel cell reliably with very small electric current.

Since the step of warming up a fuel cell to start power generation of the fuel cell for warming up another fuel cell is repeatedly performed, the entire fuel cell stack can be warmed up efficiently in a short period of time, and operation of the fuel cell stack is started rapidly.

Preferably, the fuel cells are stacked vertically, and include a coolant flow field for supplying a coolant to exchange heat in the fuel cells. An outermost fuel cell (uppermost fuel cell) is warmed up by external energy for causing the outermost fuel cell to start power generation, and an underlying fuel cell adjacent to the outermost fuel cell is warmed up. Since the coolant supplied to the fuel cell stack is warmed up from the upper position, no convection occurs in the coolant, and the fuel cell stack is warmed up reliably and efficiently.

In one embodiment, temperature of the fuel cells is measured, and at least one fuel cell having the highest temperature is warmed up by external electrical energy. Thus, the fuel cells can be warmed up efficiently in a short period of time.

If a plurality of fuel cell stacks are warmed up, after all of the fuel cells of one fuel cell stack are warmed up, the one fuel cell stack starts power generation for warming up all of the fuel cells of another fuel cell stack. Thus, the plurality of the fuel cell stacks can be warmed up rapidly and efficiently. Operation of the fuel cell stack can be started in a short period of time.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
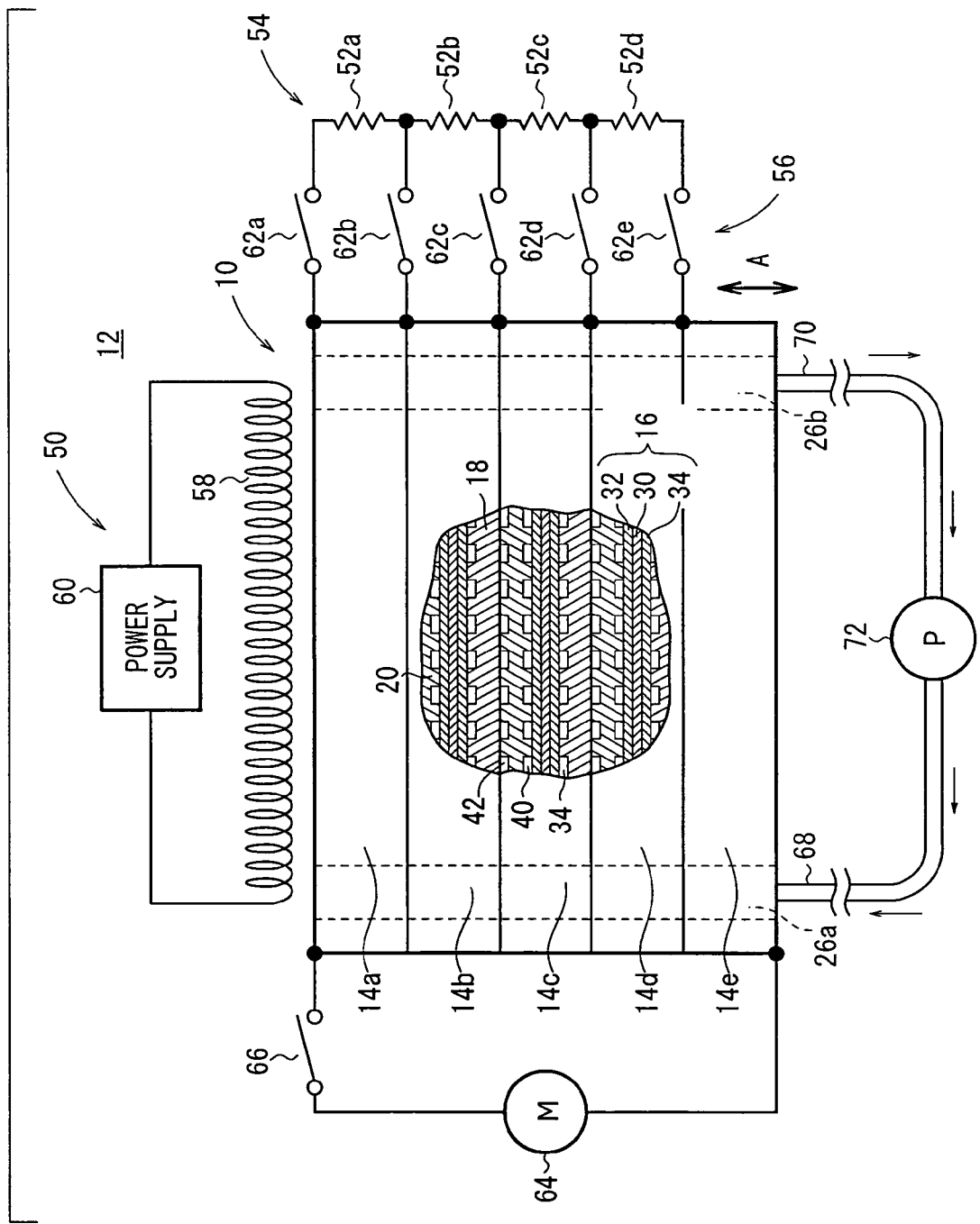
FIG. 1 is a view schematically showing a fuel cell system including a fuel cell stack according to a first embodiment of the present invention.

FIG. 1 is a view schematically showing a fuel cell system 12 including a fuel cell stack 10 according to a first embodiment of the present invention. The fuel cell stack 10 is formed by stacking a plurality of fuel cells 14a through 14e in a vertical direction indicated by an arrow A. Though only five fuel cells 14a through 14e are shown in FIG. 1 for illustrative purpose, it should be appreciated that several dozen to several hundred fuel cells are used to form the fuel cell stack in practical applications.

Next, the fuel cell 14a will be described in detail. The fuel cells 14b through 14e have the same structure with the fuel cell 14a. Therefore, the constituent elements of the fuel cells 14b through 14e that are identical to those of the fuel cell 14a are labeled with the same reference numeral, and description thereof is omitted.

Figure 2:
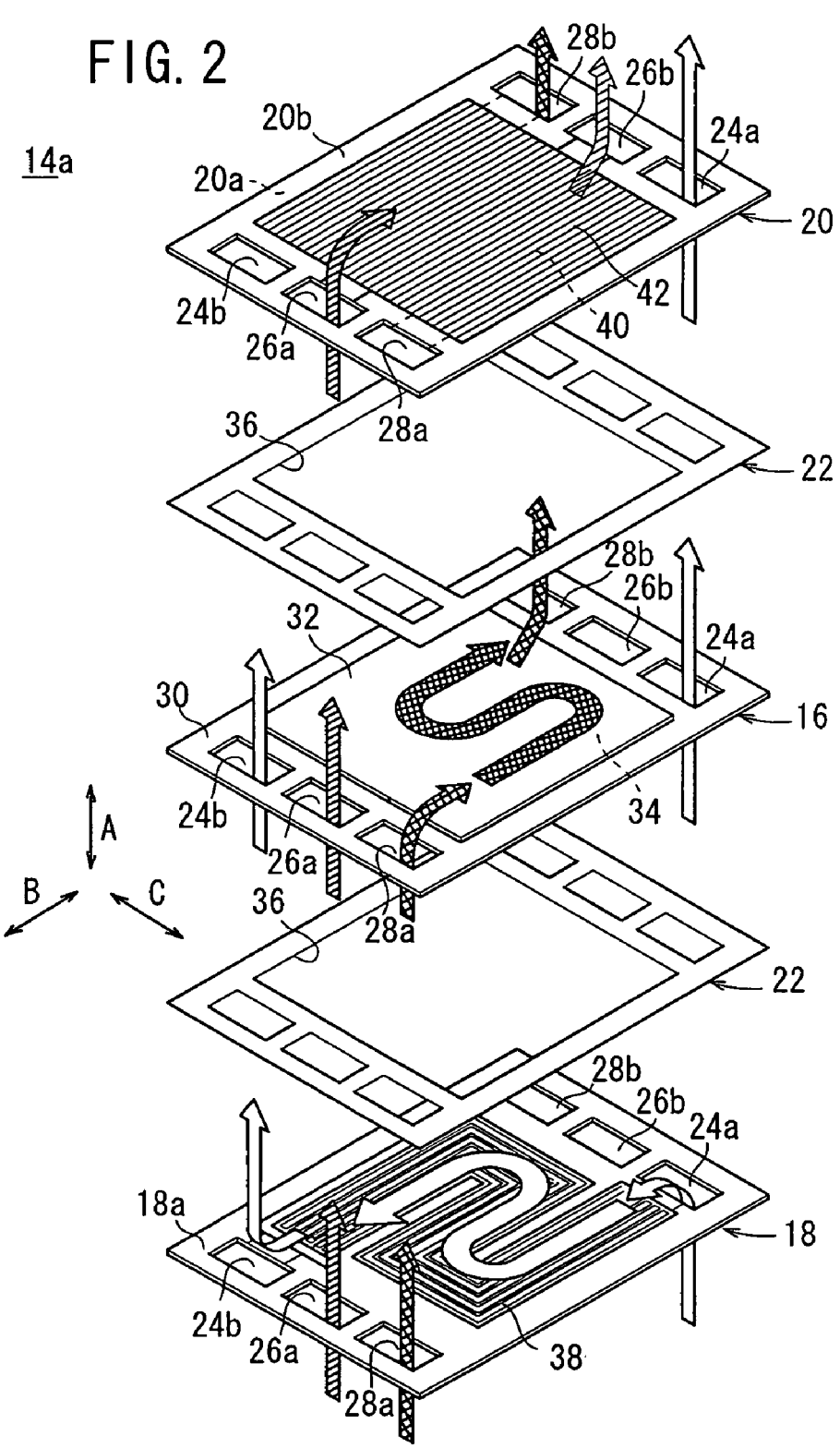
FIG. 2 is an exploded perspective view showing a fuel cell.

As shown in FIG. 2, the fuel cell 14a includes a membrane electrode assembly (electrolyte electrode assembly) 16, and first and second separators 18, 20 for sandwiching the membrane electrode assembly 16. Seal members 22 such as a gasket are provided between the membrane electrode assembly 16, and the first and second separators 18, 20 for sealing passages as described later and electrode surfaces (power generating surfaces).

At one end of the fuel cell 14a in a direction indicated by an arrow B, an oxygen-containing gas supply passage 24a for supplying an oxygen-containing gas, a coolant discharge passage 26b for discharging a coolant, and a fuel gas discharge passage 28b for discharging a fuel gas such as a hydrogen-containing gas are arranged in a direction indicated by an arrow C. The oxygen-containing gas supply passage 24a, the coolant discharge passage 26b, and the fuel gas discharge passage 28b extend through the fuel cell 14a in a stacking direction indicated by an arrow A.

At the other end of the fuel cell 14a in the direction indicated by the arrow B, a fuel gas supply passage 28a for supplying the fuel gas, a coolant supply passage 26a for supplying the coolant, and an oxygen-containing gas discharge passage 24b for discharging the oxygen-containing gas are arranged in the direction indicated by the arrow C. The fuel gas supply passage 28a, the coolant supply passage 26a, and the oxygen-containing gas discharge passage 24b extend through the fuel cell 14a in the direction indicated by the arrow A.

The membrane electrode assembly 16 comprises an anode 32, a cathode 34, and a solid polymer electrolyte membrane 30 interposed between the anode 32 and the cathode 34 (see FIGS. 1 and 2). The solid polymer electrolyte membrane (electrolyte) 30 is formed by impregnating a thin membrane of perfluorosulfonic acid with water, for example.

Each of the anode 32 and cathode 34 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 32 and the electrode catalyst layer of the cathode 34 are fixed to both surfaces of the solid polymer electrolyte membrane 30, respectively. Each of the seal members 22 has an opening 36 at a central position corresponding to the anode 32 or the cathode 34.

The first separator 18 has an oxygen-containing gas flow field 38 on its surface 18a facing the cathode 34 of the membrane electrode assembly 16. The oxygen-containing gas flow field 38 is connected to the oxygen-containing gas supply passage 24a at one end, and connected to the oxygen-containing gas discharge passage 24b at the other end. For example, as shown in FIG. 2, the oxygen-containing gas flow field 38 comprises a plurality of grooves (serpentine grooves) extending in a serpentine pattern for allowing the oxygen-containing gas to flow back and forth in the direction indicated by the arrow B, and flows in the direction indicated by the arrow C.

The second separator 20 has a fuel gas flow field 40 on its surface 20a facing the anode 32 of the membrane electrode assembly 16. The fuel gas flow field 40 has a structure similar to the oxygen-containing gas flow field 38. The fuel gas flow field 40 is connected to the fuel gas supply passage 28a at one end, and connected to the fuel gas discharge passage 28b at the other end. For example, the fuel gas flow field 40 comprises a plurality of grooves (serpentine grooves) extending in a serpentine pattern for allowing the fuel gas to flow back and forth in the direction indicated by the arrow B, and flows in the direction indicated by the arrow C.

Further, the second separator 20 has a straight coolant flow field 42 on its surface 20b opposite to the surface 20a. The coolant flow field 42 is connected to the coolant supply passages 26a at one end, and connected to the coolant discharge passages 26b at the other end. For example, the coolant flow field 42 comprises a plurality of grooves extending in the direction indicated by the arrow B.

As shown in FIG. 1, the fuel cell system 12 includes a heating mechanism 50, a power generation circuit 54, and a switching mechanism 56. The heating mechanism 50 heats the outermost fuel cell 14a provided at one end of the fuel cell stack 10 using external electrical energy. The power generation circuit 54 includes a predetermined number of, e.g., four electric heaters (loads) 52a through 52d corresponding to the four fuel cells 14a through 14d. The switching mechanism 56 selectively connects the fuel cells 14a through 14d to the power generation circuit 54, i.e., electrical energy generated in the fuel cells 14a through 14d is selectively supplied to the electric heaters 52a through 52d.

The heating mechanism 50 includes an electric heater 58 facing the fuel cell 14a. The electric heater 58 is connected to a power supply 60. The switching mechanism 56 includes switches 62a through 62e corresponding to the fuel cells 14a, 14d. For example, bimetal or Peltier element is used for the switches 62a through 62e.

A rotational load 64 such as a motor is electrically connected through a main switch 66 to opposite ends of the fuel cell stack 10 in the stacking direction. The coolant supply passage 26a of the fuel cell 14e is connected to a coolant supply pipe 68, and the coolant discharge passage 26b of the fuel cell 14e is connected to a coolant discharge pipe 70. The coolant supply pipe 68 and the coolant discharge pipe 70 are connected to a pump 72.

Figure 3:
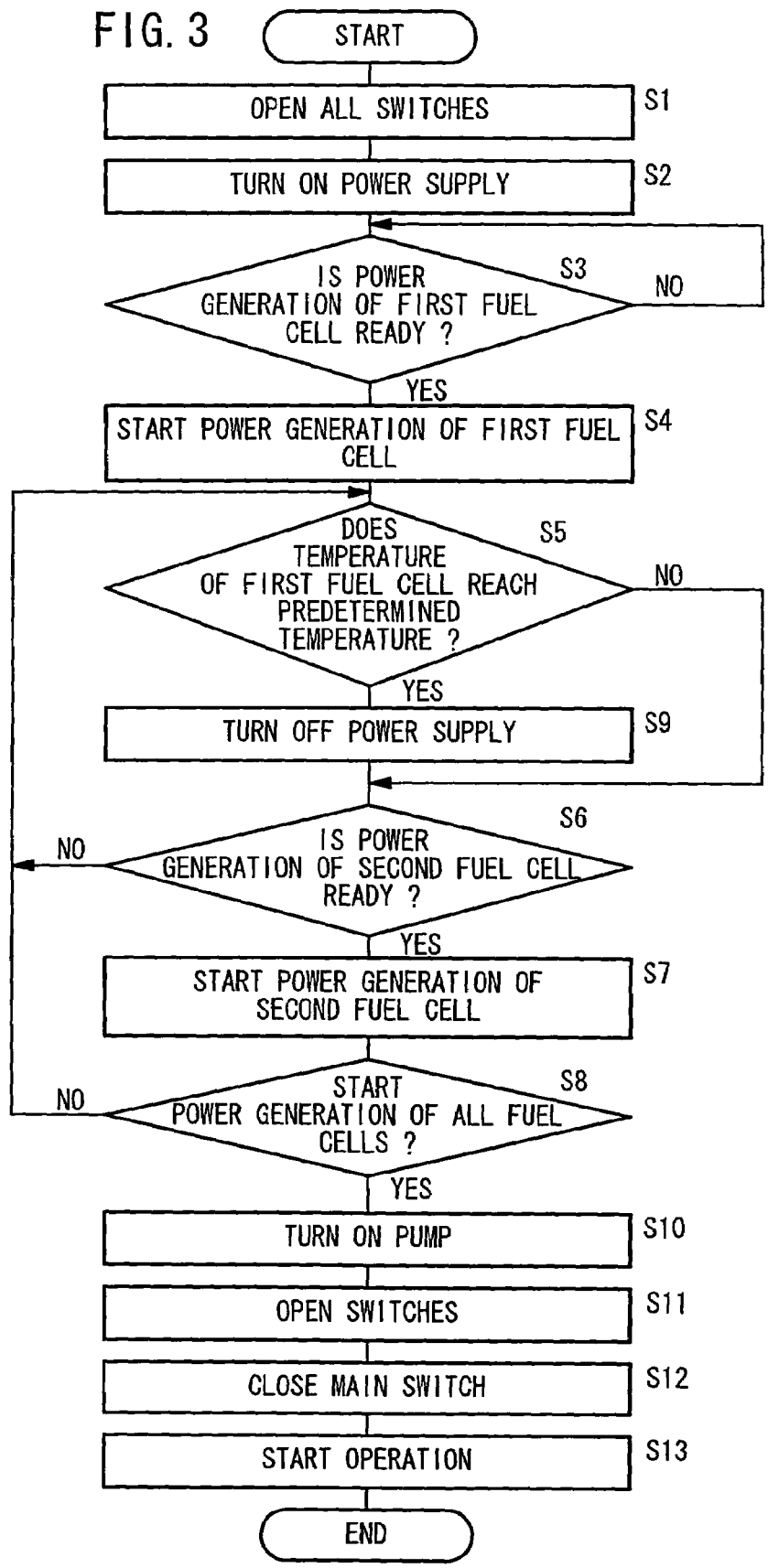
FIG. 3 is a flow chart showing a method of warming up the fuel cell according to the present invention.

Next, operation of the fuel cell stack 10 of the fuel cell system 12 will be described with reference to a flow chart shown in FIG. 3.

If operation of the fuel cell stack 10 is started at a temperature below the freezing point, for example, the condensed water may freeze undesirably during the operation. Thus, it is necessary to warm up the fuel cell stack 10. As shown in FIG. 1, all of the switches 62a through 62e of the switching mechanism 56 and the main switch 66 are open (step S1).

Under the condition, the power supply 60 is turned on (step S2) to supply electrical energy to the heater 58 facing the outermost fuel cell (first fuel cell) 14a. The heater 58 warms up the outermost fuel cell 14a. When temperature of the outermost fuel cell 14a reaches a temperature at which power generation of the fuel cell 14a is possible (hereinafter referred to as the power generation temperature) (YES in step S3), the fuel cell 14a starts power generation (step S4).

Figure 4:
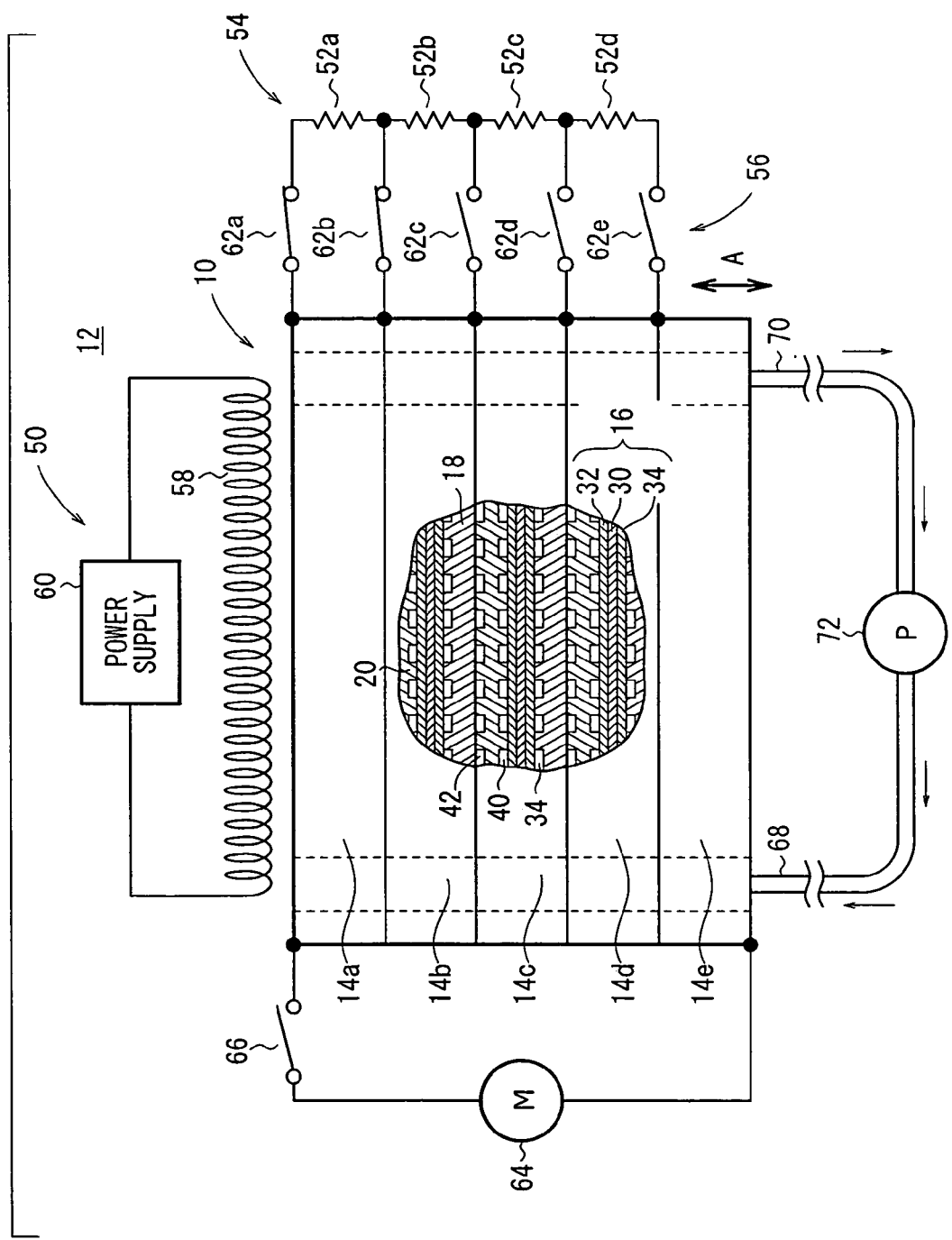
FIG. 4 is a view showing a condition in which an outermost fuel cell is warmed up.

Specifically, as shown in FIG. 1, a fuel gas such as an hydrogen-containing gas is supplied from a fuel gas supply pipe (not shown) into the fuel cell stack 10, and an oxygen-containing gas such as air is supplied from an oxygen-containing gas supply pipe (not shown) into the fuel cell stack 10. The switches 62a and 62b are closed for connecting the fuel cell 14a to the power generation circuit 54 (see FIG. 4).

Thus, as shown in FIG. 2, in the fuel cell 14a, the oxygen-containing gas flows from the oxygen-containing gas supply passage 24a into the oxygen-containing gas flow field 38 of the first separator 38, and flows along the cathode 34 of the membrane electrode assembly 16 for inducing an electrochemical reaction at the cathode 34. Similarly, the fuel gas flows from the fuel gas supply passage 28a into the fuel gas flow field 40 of the second separator 20, and flows along the anode 32 of the membrane electrode assembly 16 for inducing an electrochemical reaction at the anode 32.

In the membrane electrode assembly 16, the oxygen-containing gas supplied to the cathode 34, and the fuel gas supplied to the anode 32 are consumed in the electrochemical reactions at the electrode catalyst layers of the cathode 34 and the anode 32 for generating electricity.

After the oxygen-containing gas is consumed at the cathode 34, the oxygen-containing gas flows into the oxygen-containing gas discharge passage 24b in the direction indicated by the arrow A. Similarly, after the fuel gas is consumed at the anode 32, the fuel gas flows into the fuel gas discharge passage 28b in the direction indicated by the arrow A.

Thus, the fuel cell 14a is self-heated during power generation, and the fuel cell 14a is warmed up. Temperature of the coolant such as pure water, an ethylene glycol or an oil, and temperature of the fuel cell 14a itself are raised to heat the underlying fuel cell 14b (second fuel cell). If temperature of the fuel cell is not more than a predetermined temperature, e.g., 80° C. (NO in step S5), control passes to step S6 for determining whether temperature of the fuel cell 14b reaches the power generation temperature or not.

Figure 5:
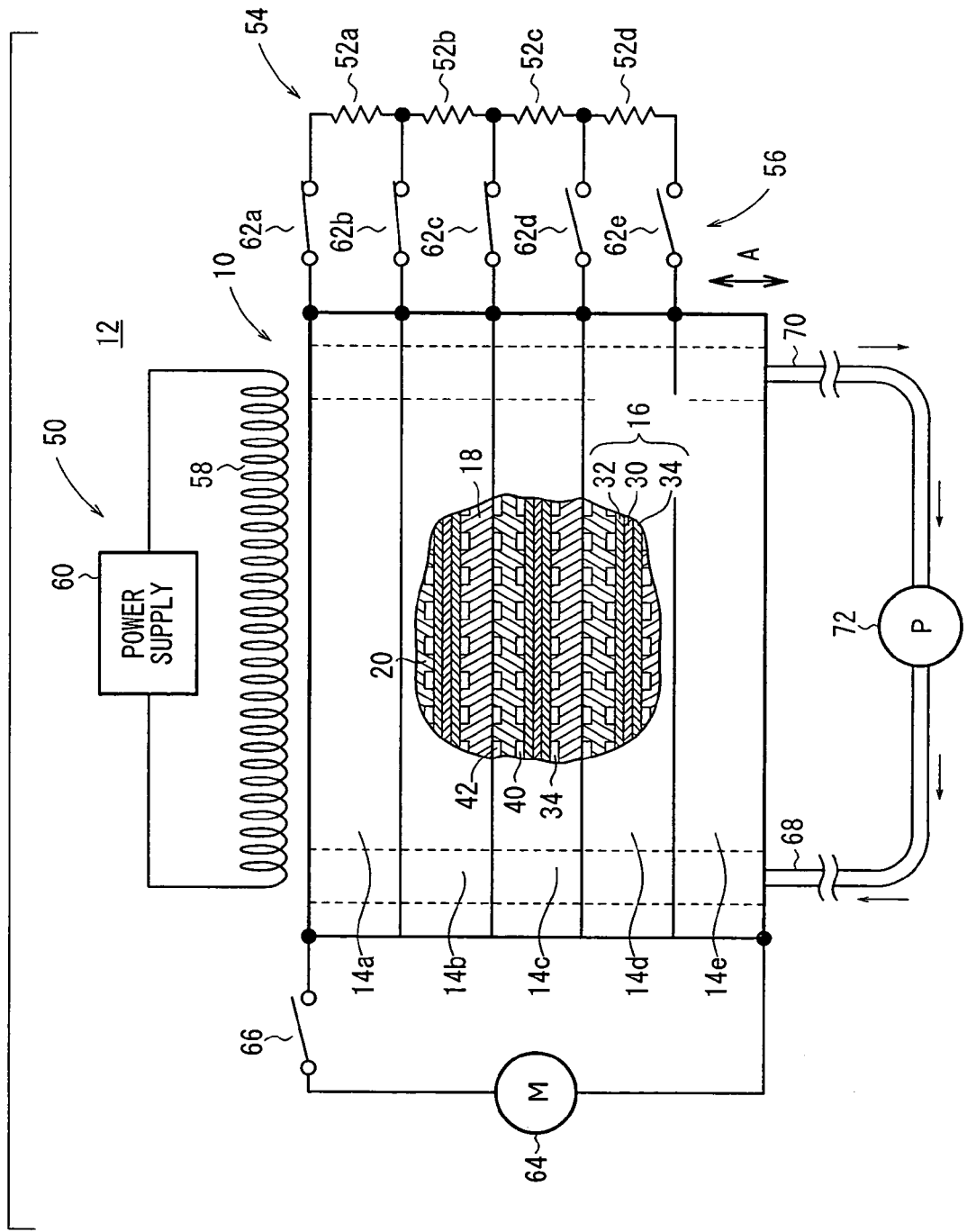
FIG. 5 is a view showing a condition in which two fuel cells are warmed up.

When temperature of the fuel cell 14b is raised to the power generation temperature (YES in step S6), the switch 62c is closed to connect the fuel cell 14b to the power generation circuit 54 (see FIG. 5). Thus, the fuel cell 14b starts generating electrical energy as with the fuel cell 14a (step S7) to warm up the underlying fuel cell 14c.

When the fuel cell 14c is warmed up by the fuel cell 14b, since there are other fuel cells 14d, 14e which need to be warmed up (No in step S8), control passes back to step S5 for determining whether the fuel cell 14a reaches the predetermined temperature or not. When the fuel cell 14a is warmed up, and reaches the predetermined temperature, control passes to step S9 for turning off the power supply 60 to stop heating the fuel cell 14a by the electric heater 58.

When the fuel cell 14c is warmed up by the fuel cell 14b, and temperature of the fuel cell 14c reaches the power generation temperature, the switch 62d is closed for connecting the fuel cell 14c to the power generation circuit 54. Thus, the fuel cell 14c starts power generation. Further, when the fuel cell 14d is warmed up by electrical energy generated by the fuel cell 14c, and temperature of the fuel cell 14d reaches the power generation temperature, the switch 62 is closed for connecting the fuel cell 14d to the power generation circuit 54. The fuel cell 14d starts generating electrical energy, and warms up the fuel cell 14e.

In this manner, when all of the fuel cells 14a through 14d are warmed up, and ready for power generation, control passes to step S10 for turning on the pump 72. Consequently, the coolant is supplied from the coolant supply pipe 68 to the coolant supply passage 26a. As shown in FIG. 2, the coolant flows into the coolant flow field 42 of the second separator 20. After the coolant is used for cooling the membrane electrode assembly 16, the coolant flows into the coolant discharge passage 26b, and is discharged from the coolant discharge passage 26b to the coolant discharge pipe 70. Temperature of the coolant is raised when the coolant flows through the fuel cell 14a. The other fuel cells 14b through 14e can be warmed up by the coolant.

Figure 6:
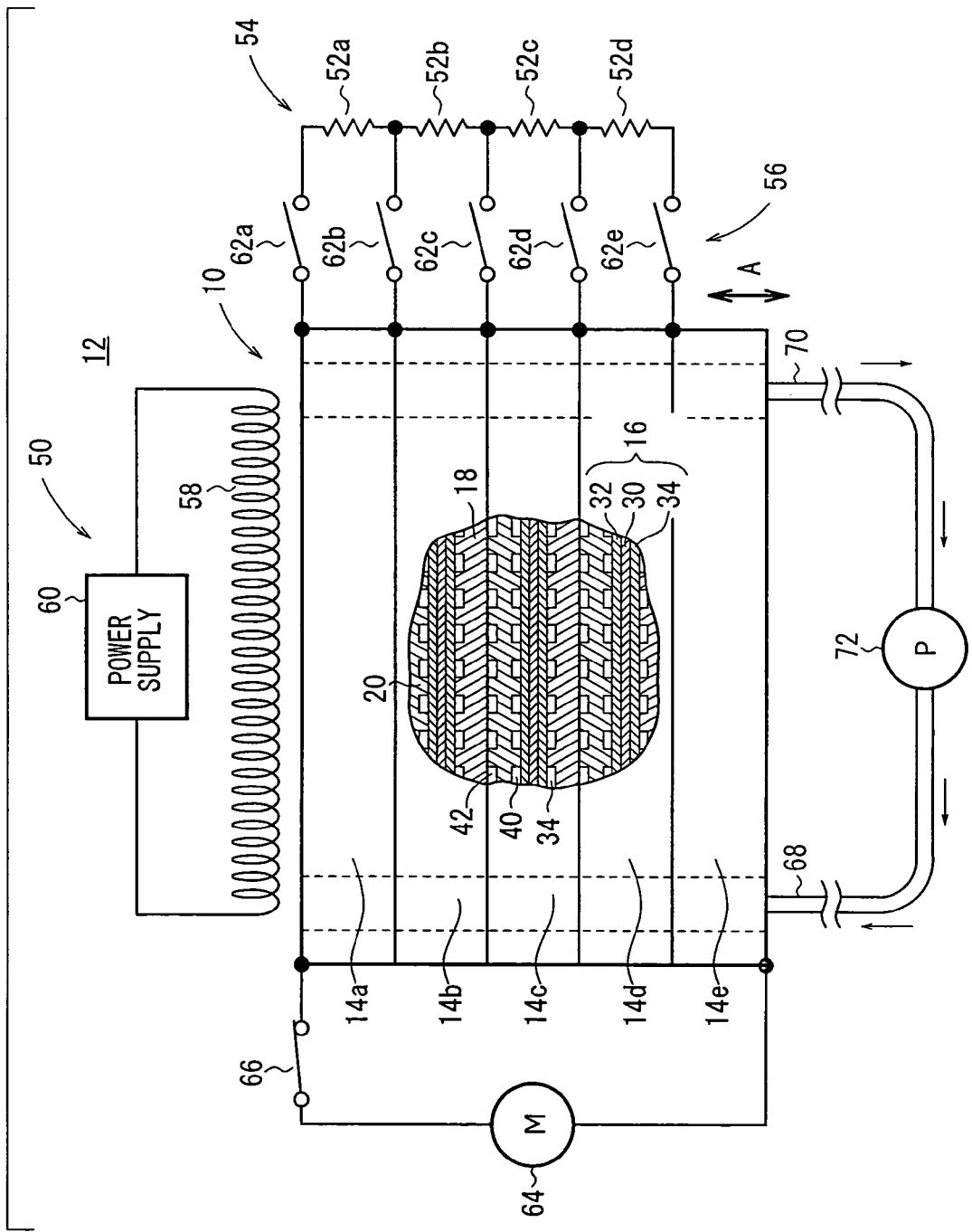
FIG. 6 is a view showing a condition in which all the fuel cells are warmed up.

Then, the switches 62a through 62e of the switching mechanism 56 are opened (step S11), and the main switch 66 is closed (step S12, see FIG. 6). Thus, the fuel cell stack 10 is connected to the rotational load 64, and drives the rotational load 64 (step S13).

In the first embodiment, the fuel cell 14a of the fuel cell stack 10 is heated by external electrical energy using the heating mechanism 50. After temperature of the fuel cell 14a reaches the power generation temperature, the fuel cell 14a starts power generation. The fuel cell 14b adjacent to the fuel cell 14a is warmed up by electrical energy generated by the fuel cell 14a, and starts power generation. The fuel cell 14c adjacent to the fuel cell 14b is warmed up by electrical energy generated by the fuel cells 14a, 14b. The fuel cells 14d and 14e are warmed up in the same manner.

As described above, only the fuel cell 14a is heated by external electrical energy, and warmed up until temperature of the fuel cell 14a reaches the power generation temperature. Then, the fuel cell 14a starts power generation to warm up the adjacent fuel cell 14b. Since it is not necessary to warm up the entire fuel cell stack 10 externally, the external thermal energy used for warming up the fuel cell 14a is small. The heating mechanism 50 can warm up the fuel cell 14a reliably with very small electric current.

The fuel cells 14a through 14e are warmed up successively by power generation. Thus, the entire fuel cell stack 10 can be warmed up efficiently in a small period of time. Operation of the fuel cell stack 10 can be started easily and rapidly.

In the fuel cell stack 10, the fuel cells 14a through 14e are stacked vertically. The outermost fuel cell 14a at the uppermost position is warmed up by the heating mechanism 50. Then, the underlying fuel cell 14b is warmed up. Since the coolant supplied to the fuel cell stack 10 is warmed up from the upper position, no convection occurs in the coolant, and the fuel cell stack 10 is warmed up efficiently.

Figure 7:
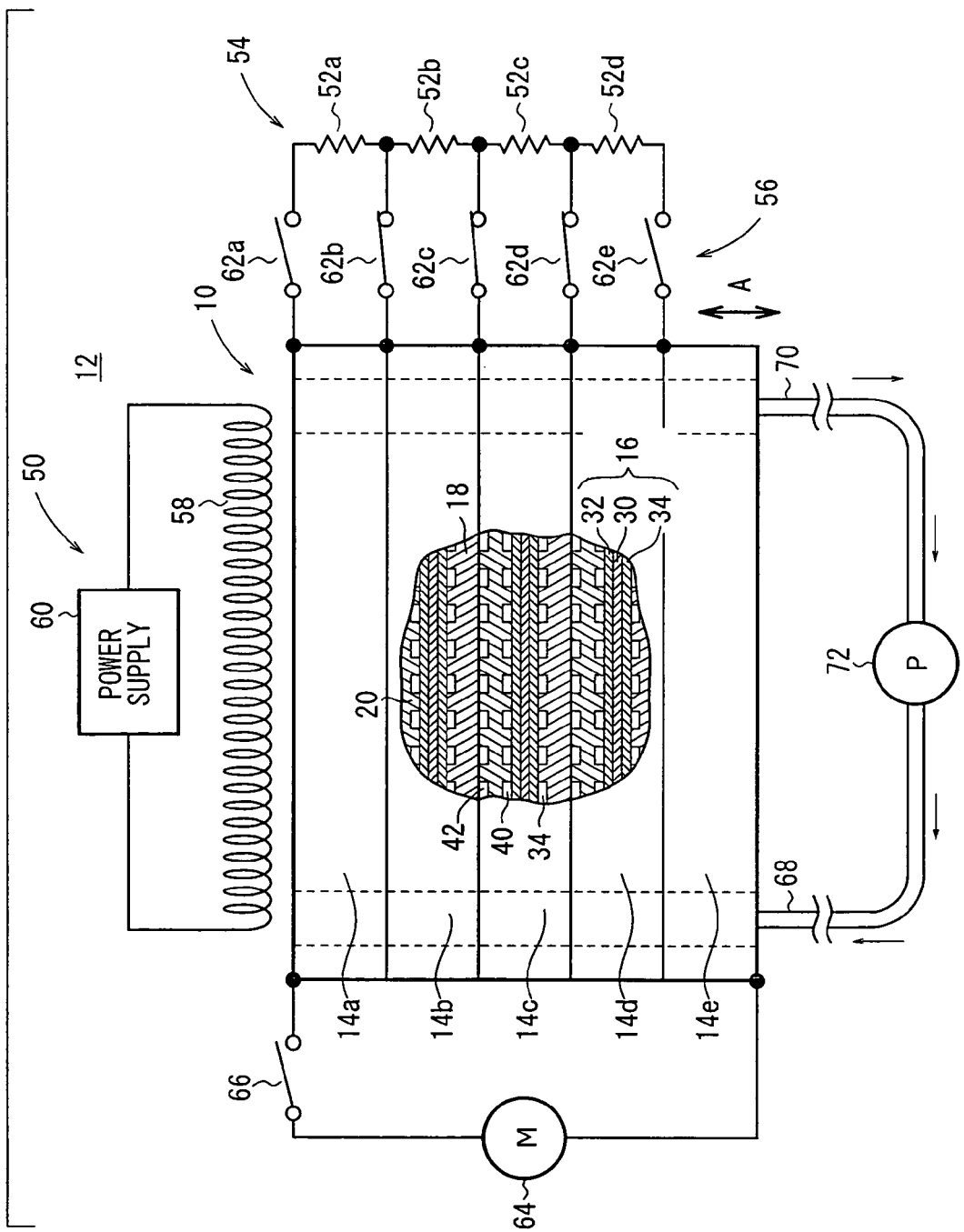
FIG. 7 is a view showing a condition in which power generation of the outermost fuel cell is stopped.

After the power supply 60 is turned off in step S9, one of the fuel cells 14a through 14b may be warmed up to reach a predetermined upper limit temperature. For example, if the outermost fuel cell 14a positioned at the upper end reaches the upper limit temperature before the lowermost fuel cell 14e reaches the power generation temperature, the switch 62a is opened as shown in FIG. 7. Thus, power generation of the fuel cell 14a is stopped, and the fuel cell 14a is not heated excessively. Similarly, if temperature of fuel cell 14b reaches the upper limit temperature while the fuel cell 14e is warmed up, the switch 62b is opened, and the fuel cell 14b is not heated excessively.

Figure 8:
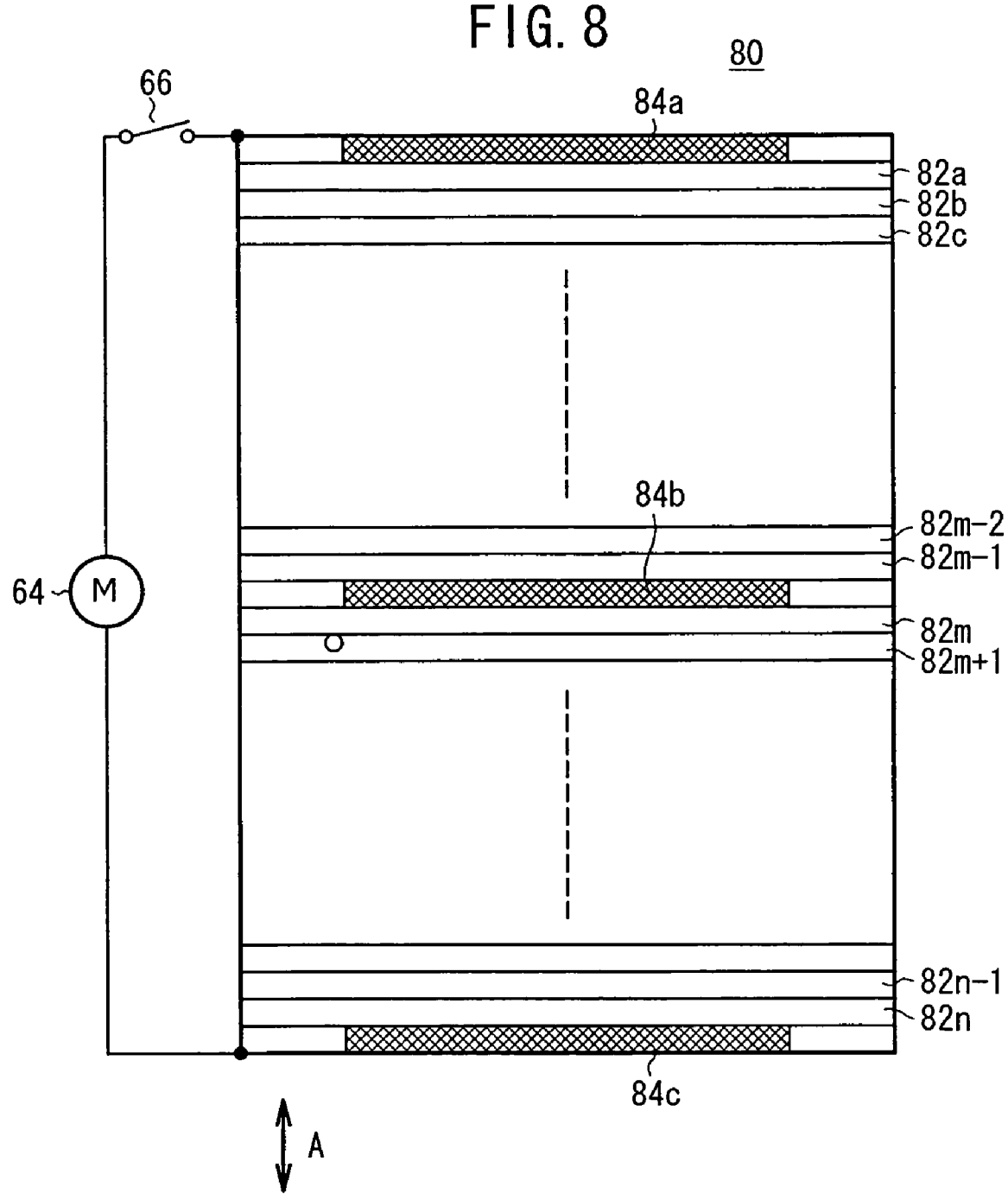
FIG. 8 is a view schematically showing a fuel cell stack according to a second embodiment of the present invention.

FIG. 8 is a view schematically showing a fuel cell stack 80 according to a second embodiment of the present invention. The constituent elements that are identical to those of the fuel cell system 12 according to the first embodiment are labeled with the same reference numeral, and description thereof is omitted.

The fuel cell stack 80 is formed by stacking a plurality of fuel cells 82a through 82n vertically in a direction indicated by an arrow A. A first heating mechanism 84a is provided adjacent to an uppermost fuel cell 82a provided at an end of the fuel cell stack 80. A second heating mechanism 84b is provided between adjacent fuel cells 82m and 82m−1 at a substantially central position. Further, a third heating mechanism 84c is provided under a lowermost fuel cell 82n at the other end of the fuel cell stack 80. Each of the first through third heating mechanism 84a through 84c includes an electric heater, for example. As with the case of the heating mechanism 50, electrical energy is externally supplied from an external power supply (not shown) to the first through third heating mechanisms 84a through 84c.

In starting operation of the fuel cell stack 80 below the freezing temperature, for example, external electrical energy is supplied to the first through third heating mechanisms 84a through 84c for heating the fuel cell stack 80. The first heating mechanism 84a warms up the adjacent fuel cell 82a, the second heating mechanism 84b warms up the adjacent fuel cells 82m, 82m−1, and the third heating mechanism 84c warms up the adjacent fuel cell 82n.

When temperature of the fuel cell 82a reaches the power generation temperature, the fuel cell 82a starts power generation, and a fuel cell 82b adjacent to the fuel cell 82a is warmed up. Similarly, a fuel cell 82m−2 adjacent to the fuel cell 82m−1, a fuel cell 82m+1 adjacent to the fuel cell 82m, and a fuel cell 82n−1 adjacent to the fuel cell 82n is warmed up. After temperature of these fuel cells reaches the power generation temperature, power generation of the fuel cells are started.

In this manner, the fuel cells start power generation successively. After a predetermined time has passed, a coolant is circulated through the fuel cell stack 80. After all of the fuel cells 82a through 82n are warmed up, the fuel cell stack 80 is connected to the rotational load 64 for driving the rotational load 64. Power generation in the fuel cells 82a through 82n is selectively carried out using the power generation circuit 54 of the first embodiment.

In the second embodiment, in some occasions, operation of the fuel cell stack 80 is restarted a relatively short period of time after it has stopped the operation. In this case, temperature in the fuel cell stack 80 may not be uniform. Thus, temperature of the fuel cell stack 10 may be measured at predetermined positions selected from the fuel cells 82a through 82b. External electrical energy is supplied to the fuel cell having the highest temperature for warming up the fuel cell and starts power generation rapidly.

For example, when temperature of the fuel cells 82a, 82m, and 82n is measured, and the fuel cell 82m has the highest temperature, the second heating mechanism 84b is operated to warm up the fuel cell 82m initially. Thus, time required for warming up the fuel cell 82m is small, and the fuel cell stack 80 can be warmed up efficiently.

Figure 9:
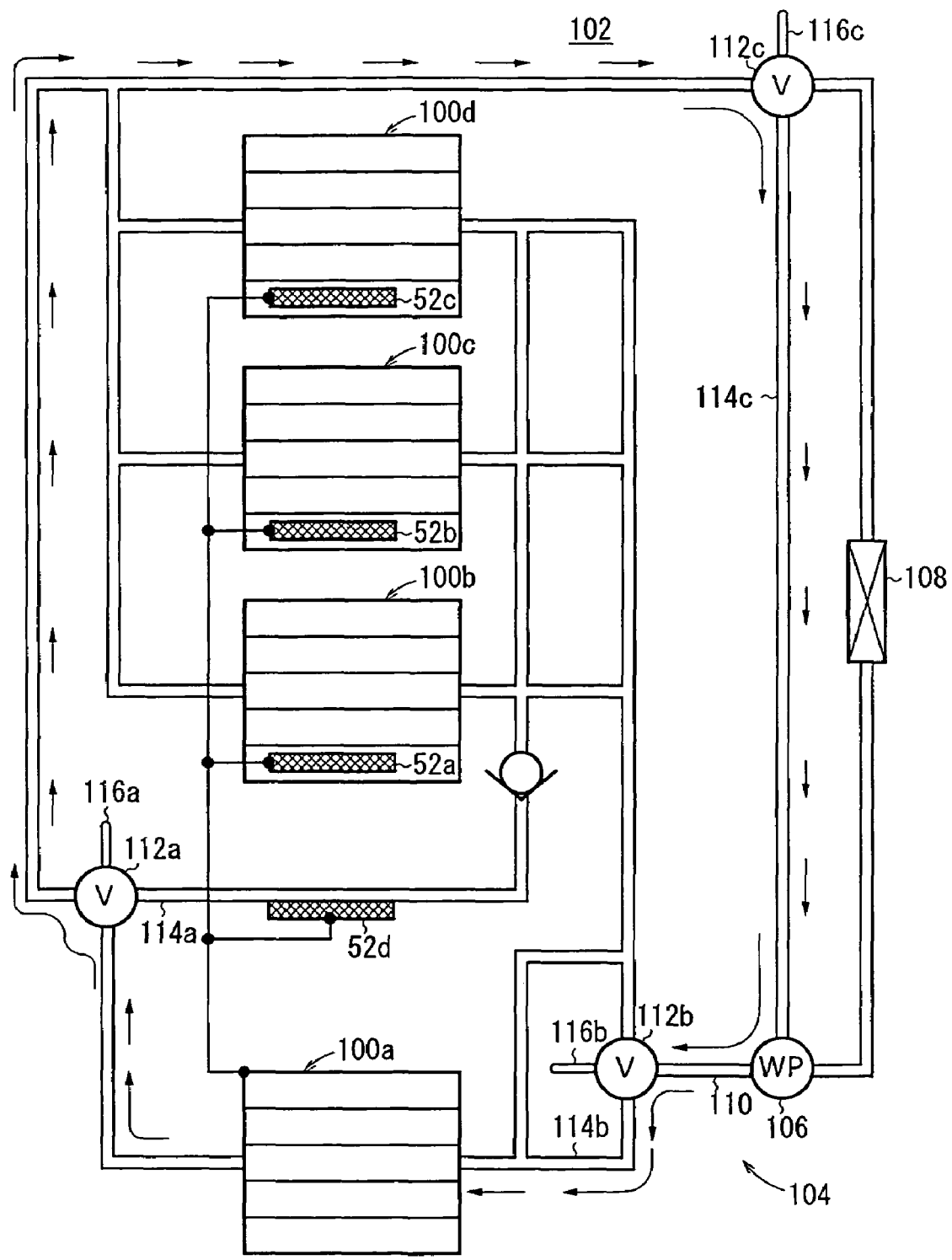
FIG. 9 is a fuel cell schematically showing a fuel cell system including fuel cell stacks according to a third embodiment.
Figure 10:
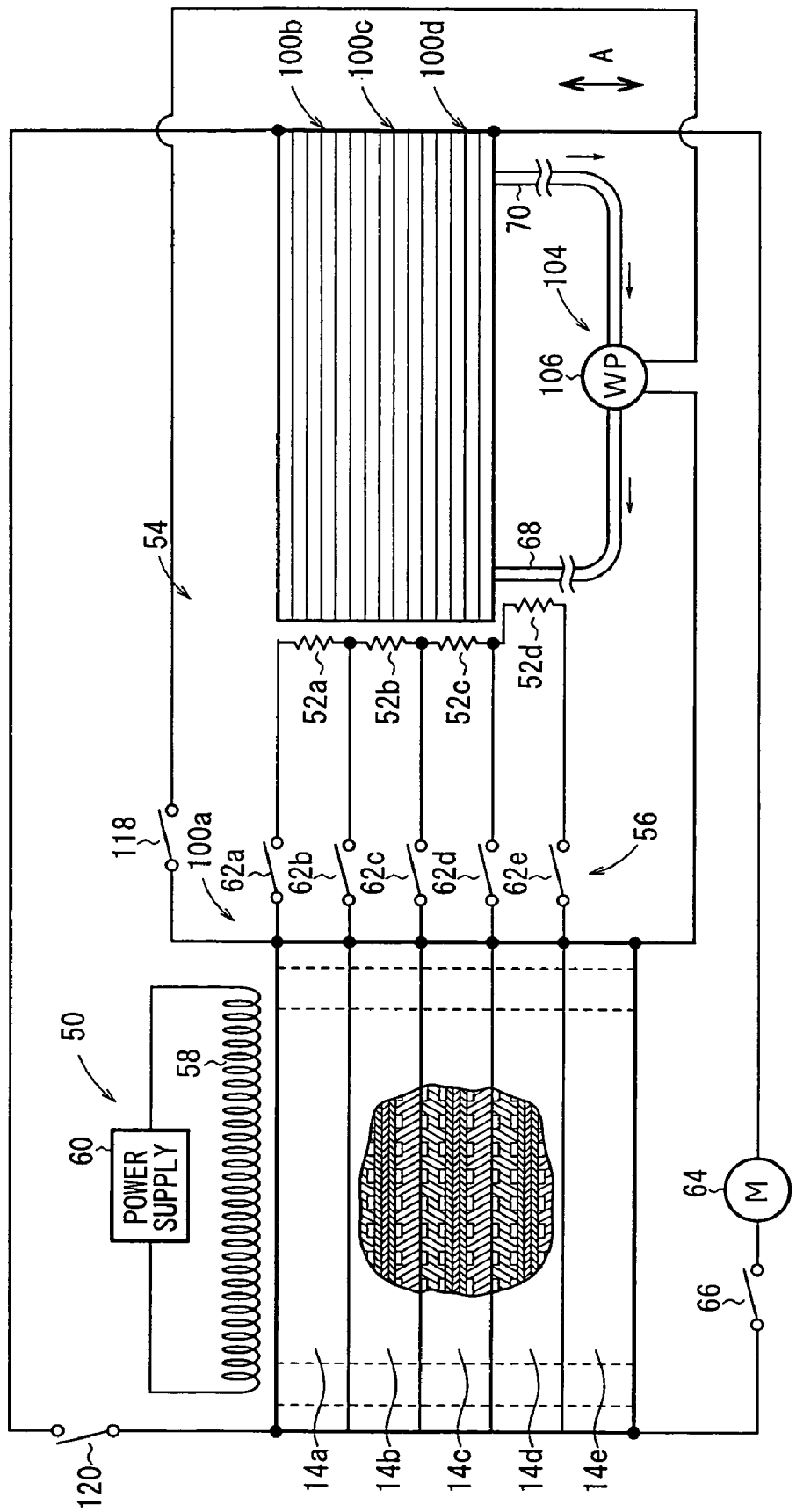
FIG. 10 is a view showing main components of the fuel cell system.

FIG. 9 is a view schematically showing a fuel cell system 102 including fuel cell stacks 100a, 100b, 100c, and 100d according to a third embodiment of the present invention. FIG. 10 is a view schematically showing warming up operation of the fuel cell 100a and warming up operation of the fuel cell stacks 100b through 100d adjacent to the fuel cell stack 100a. The fuel cell stacks 100a through 100d according to the third embodiment of the present invention has the same structure with the fuel cell stack 10 according to the first embodiment.

A coolant circuit 104 of the fuel cell system 102 includes a pump 106. The pump 106 is connected to a radiator 108. The pump 106 and a coolant pipe 110 for supplying the coolant to the fuel cell stacks 100a through 100d form a circulation passage. The coolant pipe 110 is connected to a bypass pipe 114a through a control valve 112a, connected to a bypass pipe 114b through a control valve 112b, and connected to a bypass pipe 114c through a control valve 112c. Temperature sensors 116a through 116c are connected to the control valves 112a through 112c, respectively.

Electric heaters 52a through 52c of the fuel cell stack 10a are provided in the fuel cell stack 100b through 100d, respectively for warming up the fuel cell stacks 100b through 100d. Further, an electric heater 52d heats the coolant in the bypass pipe 114a.

As shown in FIG. 10, the fuel cell stack 100a is connected to, and disconnected from the pump 106 by a switch 118. The fuel cell stack 100a is connected to, and disconnected from the fuel cell 100b using a main switch 120.

In the third embodiment, in starting operation of the fuel cell system 102 at a low temperature, all of the switches 62a through 62e and the main switches 66, 120 are opened. As with the first embodiment, power generation is started from the fuel cell 14a successively for warming up the entire fuel cell stack 100a.

When the fuel cell stack 100a is warmed up, the switches 62a through 62e are opened, and the switch 118 is closed. Thus, electrical energy is supplied from the fuel cell 100a to the pump 106, and the coolant is circulated through the coolant circuit 104 by the pump 106.

As shown in FIG. 9, the coolant pipe 110 is connected to the bypass pipes 114b, 114c. The coolant flows into only the fuel cell stack 100a through the bypass pipes 114b, 114c. The electric heaters 52a through 52c of the fuel cell stack 100a warm up the other fuel cell stacks 100b through 100d.

Figure 11:
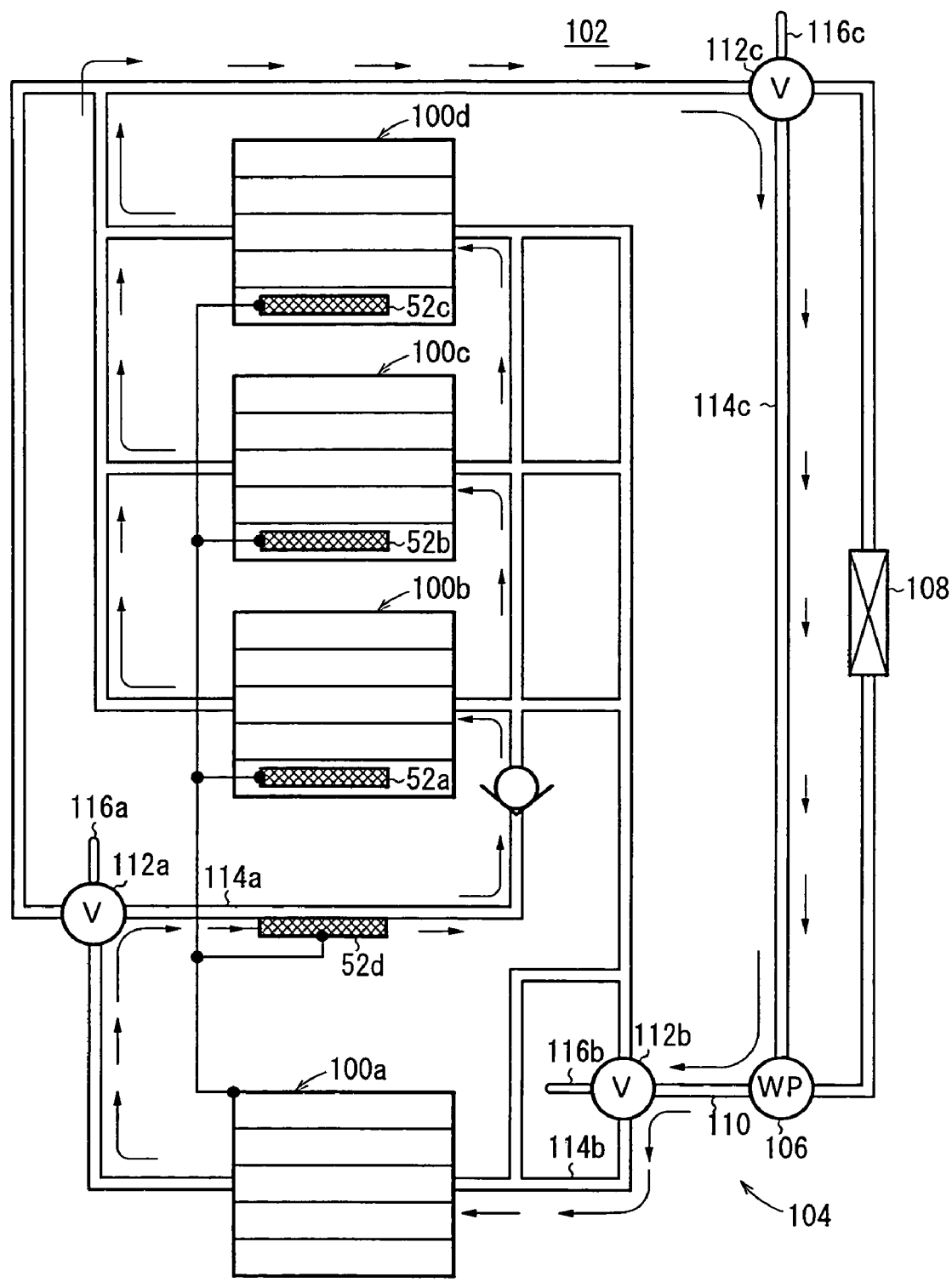
FIG. 11 is a view showing operation in which one fuel cell stack is used for warming up the remaining fuel cell stacks.

Temperature of the coolant discharged from the fuel cell stack 100a is measured by the temperature sensor 116a. When temperature of the coolant discharged from the fuel cell stack 100a reaches 5° C. or higher, for example, the control valve 112a is operated to connect the bypass pipe 114a to the coolant pipe 110 (see FIG. 11). Thus, the coolant is heated by the electric heater 52d provided adjacent to the bypass pipe 114a, and supplied to the fuel cell stacks 110b through 110d. The heated coolant flows through the fuel cell stacks 110b through 110d. Consequently, the fuel cell stacks 100b through 100d are warmed up.

Figure 12:
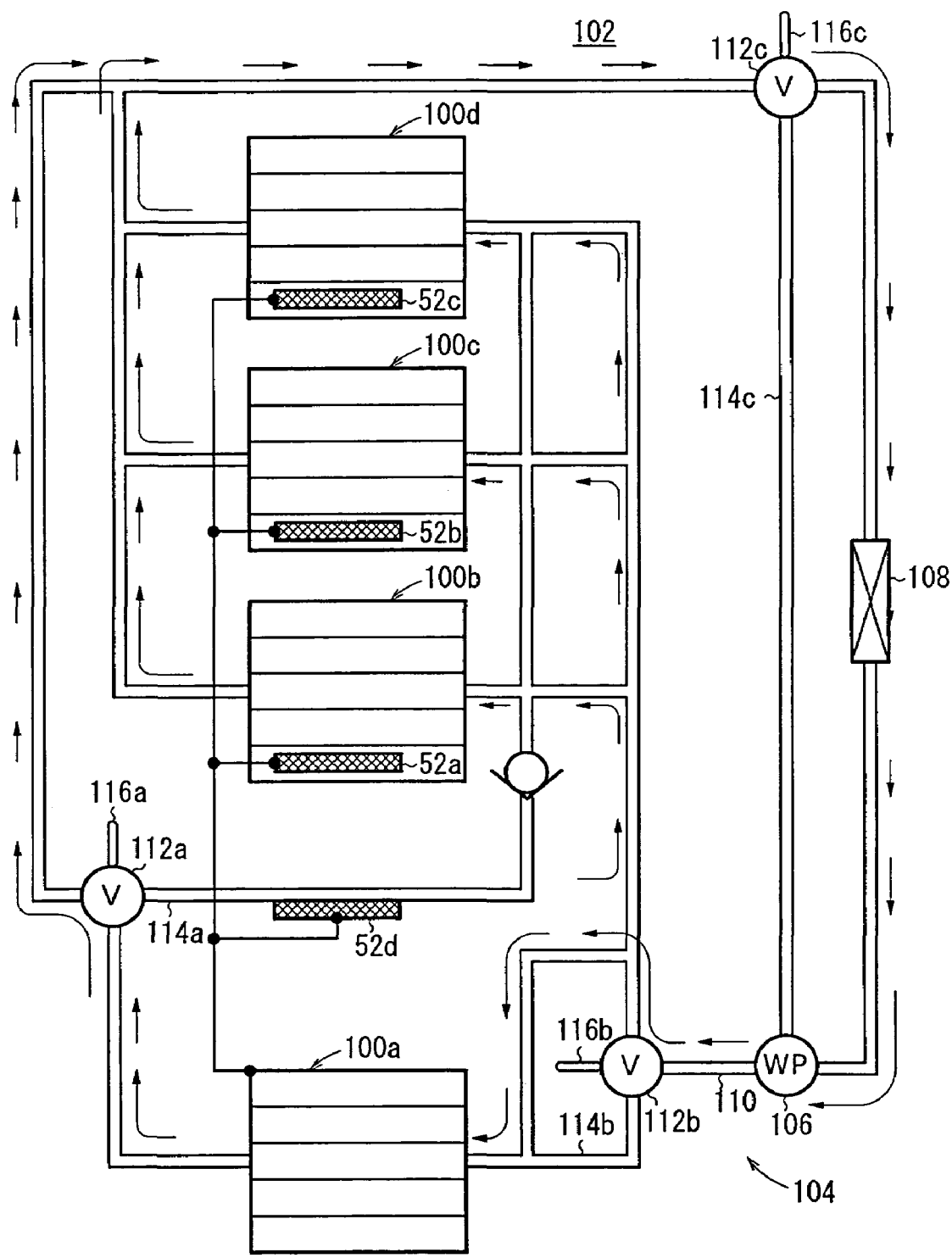
FIG. 12 is a view showing a normal power generating condition of the fuel cell system.
Figure 13:
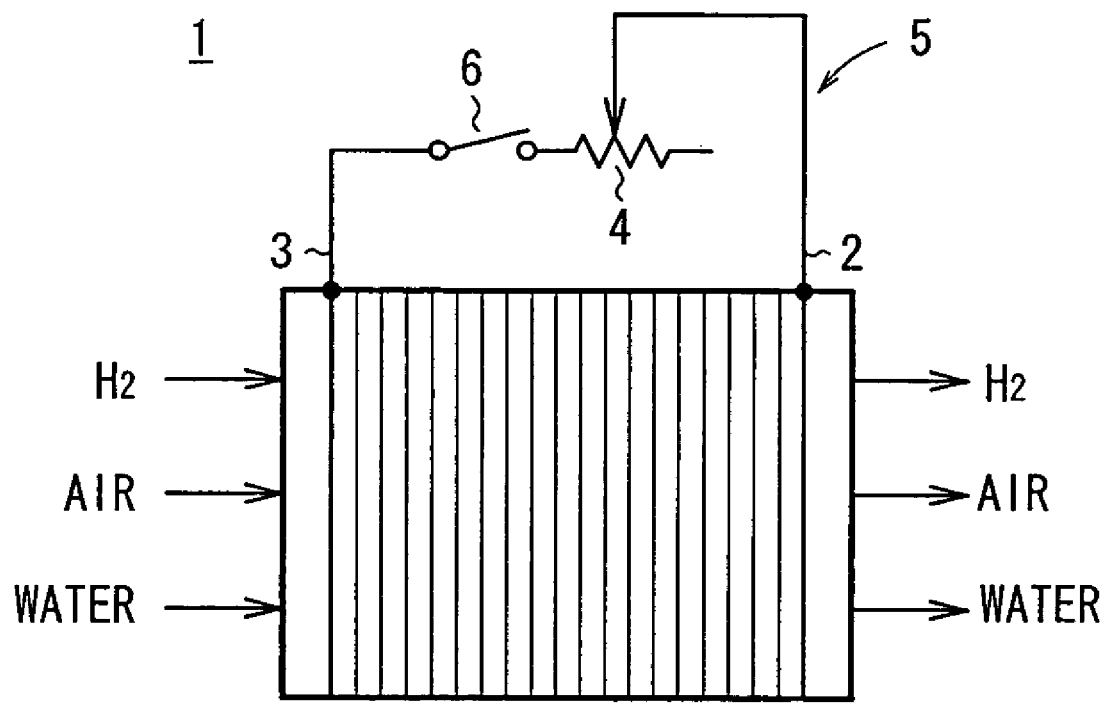
FIG. 13 is a view showing a conventional fuel cell stack.

Next, when temperature of the coolant measured by the temperature sensor 116b reaches 5° C. or higher, for example, warming up operation of the fuel cell stacks 100b through 100d is finished, and the fuel cell stacks 100b through 100d start power generation. Thus, the fuel cell stacks 100b through 100d enter the normal power generation mode (see FIG. 12). When temperature of the coolant measured by the temperature sensor 116c reaches 80° C. or higher, the coolant is supplied to the radiator 108, and cooled by the radiator 108. The cooled coolant is supplied to each of the fuel cell stacks 100a through 100d.

As described above, after the fuel cell stacks 100a through 100d are warmed up, the switch 118 is opened, and the main switches 66, 120 are closed. Thus, the fuel cell stacks 100a through 100d are electrically connected to the rotational load 64. Power generation of the fuel cell stacks 100a through 100d is started for driving the rotational load 64.

In the third embodiment, firstly, all of the fuel cells 14a through 14e of the fuel cell stack 100a are warmed up. Electrical energy generated by the fuel cell stack 100a is utilized for warming up the other fuel cell stacks 100b through 100d. Thus, the fuel cell system 102 including the plurality of the fuel cell stacks 100a through 100d is warmed up rapidly and efficiently. Operation of the fuel cell system 102 is started desirably in a short period of time.

In the fuel cell stack and the method of warming up the fuel cell stack according to the present invention, at least one of the fuel cell of the fuel cell stack is heated by external electrical energy. When the fuel cell stack is warmed up, and temperature of the fuel cell reaches a power generation temperature, power generation of the fuel cell is started for warming up the adjacent fuel cell. Since it is not necessary to warm up the entire fuel cell stack externally, the external thermal energy needed for warming up the fuel cell is considerably reduced. The heating mechanism can warm up the fuel cell reliably with very small electric current.

Since the step of warming up a fuel cell to start power generation of the fuel cell for warming up another fuel cell is repeatedly performed, and thus, the entire fuel cell stack can be warmed up efficiently in a short period of time, and operation of the fuel cell stack is started rapidly.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising a fuel cell stack formed by stacking a plurality of fuel cells each including an electrolyte electrode assembly and a pair of separators for sandwiching said electrolyte electrode assembly, said electrolyte electrode assembly including a pair of electrodes and an electrolyte interposed between said electrodes;

a heating mechanism for heating at least one of said fuel cells by external electrical energy;

a power generation circuit having a plurality of loads, wherein each fuel cell is connected to a corresponding one of said plurality of loads, wherein the power generation circuit causes said fuel cell to generate electrical energy; and a switching mechanism for selectively disconnecting one or more of said fuel cells from said corresponding one of said plurality of loads of said power generation circuit to stop generating electrical energy.

2. A fuel cell system according to claim 1, wherein said plurality of fuel cells are stacked vertically, and said heating mechanism is provided at least above an outermost fuel cell at an upper end of said fuel cell stack.

3. A fuel cell stack according to claim 1, wherein said power generation circuit includes an electric heater.

4. A fuel cell system according to claim 1, further comprising:

a separate heating mechanism for heating a coolant that is supplied to said fuel cells.

5. A method of warming up a fuel cell stack formed by stacking a plurality of fuel cells each including an electrolyte electrode assembly and a pair of separators for sandwiching said electrolyte electrode assembly, said electrolyte electrode assembly including a pair of electrodes and an electrolyte interposed between said electrodes, said method comprising the steps of:

(1) warming up at least one of said plurality of fuel cells by external electrical energy until a temperature of said at least one fuel cell reaches a power generation temperature;

(2) causing said at least one of said plurality of fuel cells to generate electrical energy for warming up an adjacent fuel cell;

(3) causing said at least one of said plurality of fuel cells and said adjacent fuel cell to generate electrical energy for warming up still another fuel cell; and repeating the step (3) for all of said plurality of fuel cells of said fuel cell stack for warming up all of said plurality of fuel cells.

6. The method according to claim 5, wherein said plurality of fuel cells are stacked vertically, and include a coolant flow field for supplying a coolant to exchange heat, said method comprising the step of:

warming up an outermost fuel cell using external energy for causing said outermost fuel cell to generate electrical energy, and warming up an underlying fuel cell adjacent to said outermost fuel cell.

7. The method according to claim 6, wherein after all of said plurality of fuel cells are warmed up, said coolant is circulated through said coolant supply field of said fuel cells.

8. The method according to claim 5, wherein when one of said plurality of fuel cells is warmed up to a predetermined temperature, a warming up operation of said fuel cell having said predetermined temperature is finished.

9. The method according to claim 5, further comprising the steps of:

measuring a temperature of one or more of said plurality of fuel cells; and warming up at least one fuel cell having the highest temperature by the external electrical energy.

10. The method according to claim 5, wherein a plurality of fuel cell stacks are warmed up, and said method thither comprising the step of:

after warming up all of the fuel cells of one fuel cell stack, causing said one fuel cell stack to generate electrical energy for warming up all of the fuel cells of another fuel cell stack.

11. The method according to claim 10, wherein after temperature of a coolant circulated through said one fuel cell stack reaches a predetermined temperature, said coolant is circulated through another fuel cell stack for warming up said other fuel cell stack.

* * * * *